US012329999B2

(12) United States Patent
Cooper

(10) Patent No.: US 12,329,999 B2
(45) Date of Patent: Jun. 17, 2025

(54) BULLDOZER WITH FIRE APPARATUS

(71) Applicant: Grant Stanton Cooper, San Rafael, CA (US)

(72) Inventor: Grant Stanton Cooper, San Rafael, CA (US)

( * ) Notice: Subject to any disclaimer, the term of this patent is extended or adjusted under 35 U.S.C. 154(b) by 379 days.

(21) Appl. No.: 17/859,492

(22) Filed: Jul. 7, 2022

(65) Prior Publication Data

US 2023/0009324 A1 Jan. 12, 2023

Related U.S. Application Data

(60) Provisional application No. 63/219,635, filed on Jul. 8, 2021.

(51) Int. Cl.
*A62C 27/00* (2006.01)
*A62C 31/00* (2006.01)
*E02F 3/80* (2006.01)

(52) U.S. Cl.
CPC ............ *A62C 27/00* (2013.01); *A62C 31/005* (2013.01); *E02F 3/80* (2013.01)

(58) Field of Classification Search
CPC .............................. A62C 27/00; A62C 31/005
See application file for complete search history.

(56) References Cited

U.S. PATENT DOCUMENTS 2,686,644 A * 8/1954 Pratt ...................... A62C 35/20 248/90
3,770,060 A * 11/1973 Forsyth .................. A62C 27/00 169/24
4,593,855 A * 6/1986 Forsyth .................. A62C 27/00 239/74
4,875,526 A * 10/1989 Latino .................. A62C 3/0292 239/289
5,113,946 A * 5/1992 Cooper .................. A62C 27/00 169/24
5,476,146 A * 12/1995 Brown ................... A62C 27/00 169/14
5,626,194 A * 5/1997 White .................. A62C 3/0278 169/62
5,836,398 A * 11/1998 White .................. A62C 3/0278 169/62
6,142,238 A * 11/2000 Holt ..................... A62C 3/0292 169/45
6,164,560 A * 12/2000 Lehrke ................... A01G 25/09 239/304
6,289,995 B1 * 9/2001 Fuller ................... F41B 9/0031 239/722

(Continued)

*Primary Examiner* — Joseph A Greenlund
(74) *Attorney, Agent, or Firm* — Barry Choobin; Patent 360

(57) ABSTRACT

An apparatus for a bulldozer that makes the process of controlling a wildfire safer and more effective. The apparatus includes a large capacity water tank that can be mounted to a rear of dozer using a frame. A pump can draw water from the water tank and pump the water at a high pressure. One or more hose reels can also be provided. Strategically positioned sprayers can spray water to nearby surrounding, in particular, on the Fireline made by the dozer. A major safety feature is a remote controlled monitor mounted on the front of the dozers can spray water directed by the operator can protect the dozer from fire as well as fire personnel if a fire comes at the dozer or fire personnel.

13 Claims, 3 Drawing Sheets

(56) References Cited

U.S. PATENT DOCUMENTS

| | | | | |
|---|---|---|---|---|
| 6,367,648 | B1 * | 4/2002 | Boone, Jr. | B60P 3/2235 220/563 |
| 9,051,709 | B1 * | 6/2015 | Nakata | E02F 3/7618 |
| 10,434,346 | B1 * | 10/2019 | Weis | G09B 19/24 |
| 2004/0055765 | A1 * | 3/2004 | Dillman | A62C 3/0292 169/47 |
| 2004/0089458 | A1 * | 5/2004 | Jones | A62C 27/00 169/24 |
| 2004/0118937 | A1 * | 6/2004 | Feller | A62C 27/00 239/146 |
| 2005/0126631 | A1 * | 6/2005 | Gorman, Jr. | A62C 27/00 137/128 |
| 2009/0200046 | A1 * | 8/2009 | Macdonald | A62C 99/0009 169/46 |
| 2010/0218960 | A1 * | 9/2010 | Dillman | A62C 27/00 169/45 |
| 2011/0186657 | A1 * | 8/2011 | Haviland | F41B 9/0087 239/722 |
| 2012/0211292 | A1 * | 8/2012 | Werner | B60K 11/04 180/68.1 |
| 2017/0328029 | A1 * | 11/2017 | Tsuji | E02F 5/32 |
| 2017/0335548 | A1 * | 11/2017 | Noda | E02F 3/7609 |
| 2018/0050588 | A1 * | 2/2018 | Uemura | E02F 3/815 |
| 2018/0297597 | A1 * | 10/2018 | Linsmeier | B60W 10/30 |
| 2021/0101037 | A1 * | 4/2021 | Ryczek | A62C 35/02 |
| 2021/0275845 | A1 * | 9/2021 | Turner | A62C 37/10 |
| 2022/0347835 | A1 * | 11/2022 | Majetic | B25J 5/005 |
| 2023/0009324 | A1 * | 1/2023 | Cooper | A62C 3/0292 |

* cited by examiner

BULLDOZER WITH FIRE APPARATUS

CROSS-REFERENCE TO RELATED APPLICATIONS

This application claims priority from a U.S. Provisional Patent Appl. No. 63/219,635 filed on Jul. 8, 2021, which is incorporated herein by reference in its entirety.

FIELD OF INVENTION

The present invention relates to a bulldozer, and more particularly, the present invention relates to an apparatus for a bulldozer that aids in controlling the fire and protects the dozer from fire.

BACKGROUND

Wildfires, also known as forest fires, are a grave natural disaster that destructs the landscape, lives, and property. Besides the damage and destruction caused by uncontrolled and massive wildfires, the release of greenhouse gases significantly contributes to global warming. So, there is an opportunity to limit the spread of wildfire and prevent further damage and destruction to the environment, property, and lives by utilizing these bulldozers with the fire apparatus designed especially for bulldozers to be retro fitted with.

Fighting wildfire is difficult due to the massiveness of fire, several obstacles, and challenging forest terrain. For these reasons, firetrucks are unable to reach the some sites of fire. Bulldozers are common in controlling the wildfires. Bulldozers can move on the rough terrains and make a fire line to prevent the spread of wildfire. However, the dozers are not adapted for firefighting and suffers from major limitations. Such limitations of the known bull dozers to fight wildfires has resulted in several accidents, some with death.

Thus, a need is appreciated for improvements in the bulldozers to overcome the previously mentioned limitations. A need is appreciated for an apparatus for a dozer that can make the wildfire fighting more effective and safer.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an apparatus for a bulldozer that can make firefighting more effective and safer.

It is another object of the present invention that the apparatus can retrofit to a bull dozer.

It is still another object of the present invention that the apparatus can be installed in new bull dozers.

It is a further object of the present invention that the apparatus can safeguard the operator and dozer from fire.

It is yet another object of the present invention that the apparatus does not significantly affect the operation and stability of the bulldozer.

In one aspect, disclosed are an apparatus for a bulldozer and a bulldozer with the apparatus that are safer and more effective in controlling the wildfires.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
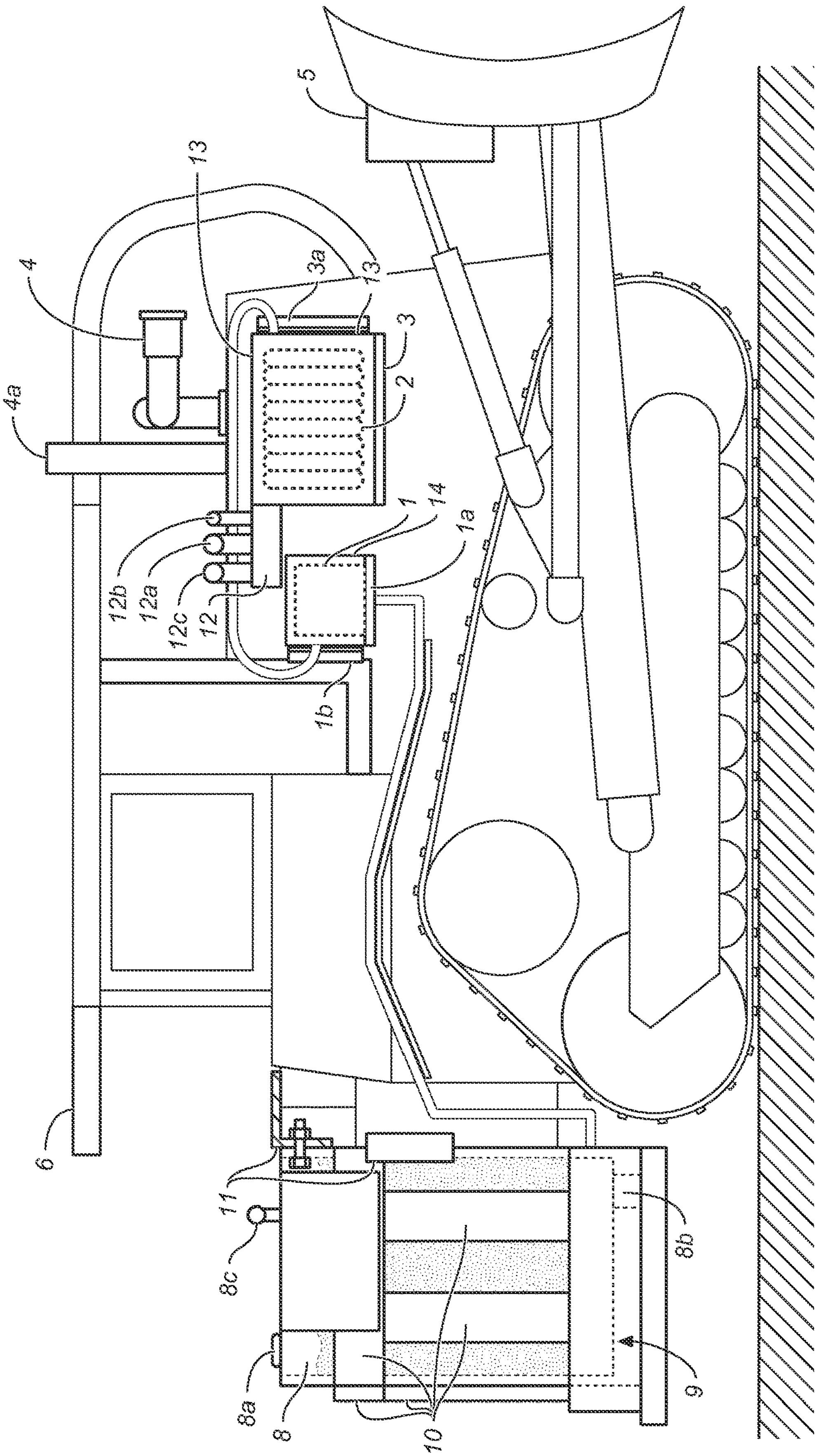
FIG. 1 is a side view of a bulldozer and an apparatus, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

REFERENCE NUMERALS

1 Pump
1*a* Steel Platform
1*b* Platform hinge
2 Hose reels
2*a* Valves
3 Hose reel platforms
3*a* Platform hinge
4 Remote Control Fire monitor
4*a* Exhaust stack
5 Fire Hose Storage on back of dozer blade
6 Fire Hose Storage on back of canopy
7 Tank
8*a* Filling hole
8*b* Drain hole
8*c* 1.5" Fire Hose filling ports
9 Heavy Angle Iron Protective Frame
10 Heavy channel iron on sides of tank
11 Bolt on Brackets on tank to dozer
12 Manifold
12*a* Outlet 1: 1.5 inches male hose connection with Valve
12*b* Outlet 2: 1 inch male hose connection with Valve
12*c* Side Spray with Remote Control
13 Protective Hose reel steel cabinets
14 Protective Fire pump steel cabinet
15 Storage cabinets Disclosed is an apparatus for a bulldozer that allows making the bulldozers safer and more effective in controlling the wildfires. Also, disclosed are the bulldozers with the disclosed apparatus. The disclosed bulldozer includes all the advantages of a conventional bulldozer including bush clearing and bull dozing functions of a crawler-type tractor. The apparatus allows using water to extinguish the fire and save the dozer from fire damage. The apparatus allows for stably holding large capacity of water in a water tank without wobbling and effecting the operation of the dozer on rugged terrain. The disclosed dozer can extinguish the fire spreading to the Fireline using water or similar fire retardant. The fire reaching the Fireline can harm both the fire dozer and the operator of the bulldozer, and by extinguishing the fire, the disclosed apparatus can safeguard the bulldozer and the operator. Moreover, preventing the fire from escaping containment lines is critical to shortening and reducing fire size. The disclosed apparatus can include the functionality of a fire truck by accommodating large water tanks, high power water pump, hose reels, hose manifolds, fire monitors, and side sprays. Besides water, the apparatus may also allow applying suitable fire retardants known for use in controlling and extinguishing wildfires.

Figure 2:
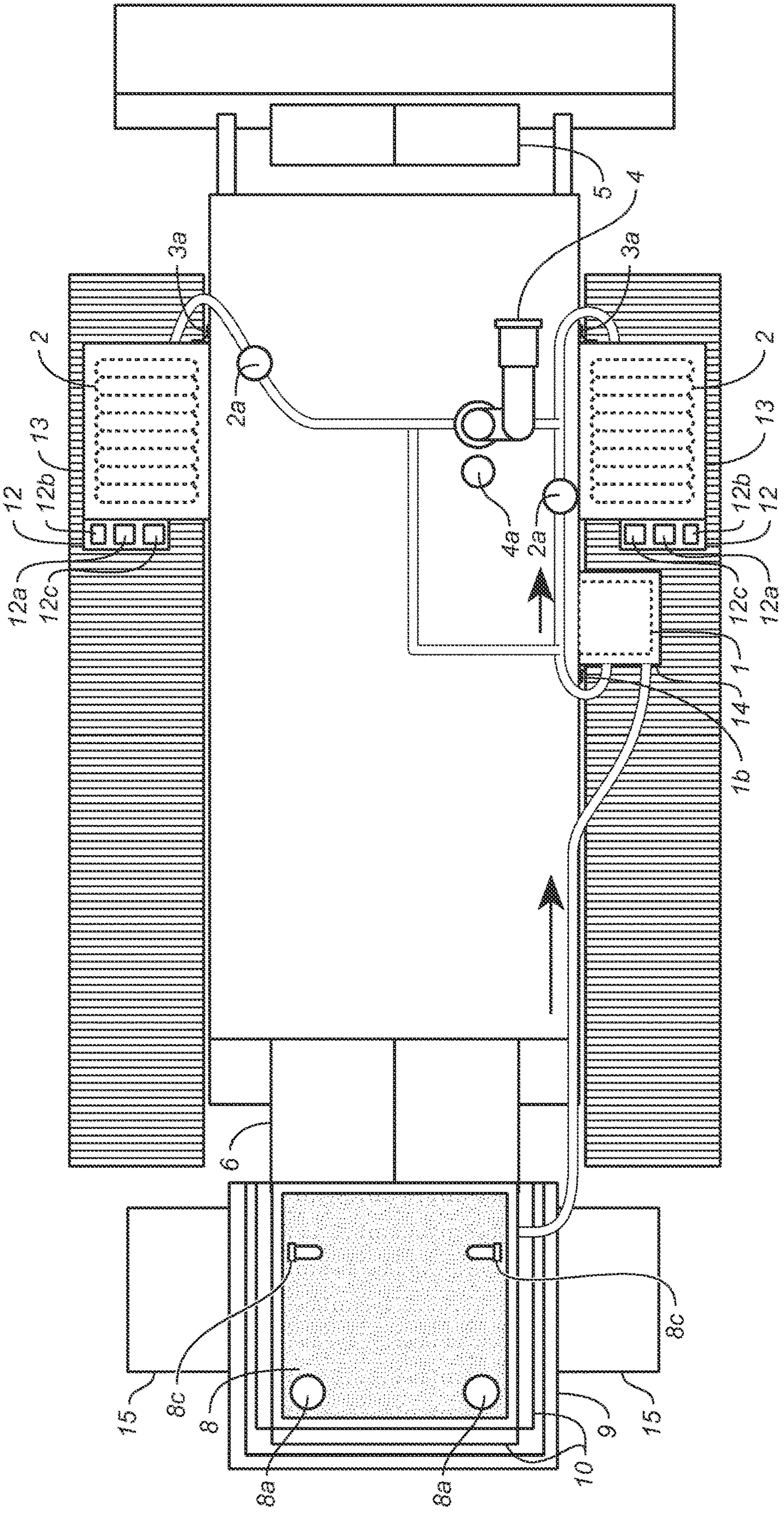
FIG. 2 is a top view of the bulldozer, according to an exemplary embodiment of the present invention.

Referring to FIGS. 1 and 2, the apparatus can include a pump 1. The pump can be a high-pressure pump suitable for firefighting and can be installed in front or side of an operator cabin door, or entrance to the bulldozer. The input of the pump can be connected to a water tank 8 through a suitable conduit. In one implementation, the pumps can deliver at least 200 PSI so to pump water uphill to a fire that is several hundred feet higher than the dozer. The pumps can be mounted on a custom build hinged steel platform 1*a* that will allow the pump to swing away providing access to the dozers internal hardware for maintenance when needed. The hinge 1*b* can be used to mount the pump. The pumps can be covered by a steel cover attached to the swing platform protecting the pump from tree or brush damage.

The water tank can be mounted on a rear of the dozer. FIGS. 1 and 2 shows a large capacity tank mounted to a rear end of the dozer using a Bolt on Brackets on tank to dozer 11. It is understood, however, that any other brackets and supports can be used to mount the tank depending on the weight of the tank, and any such brackets and supports are within the scope of the present invention. FIG. 1 shows the heavy angle iron protective frame 9 and heavy channel iron bars on sides of tank 10 for support and protection of the tank from external impacts and insults. Any suitable protective frame can be used to protect the tank and shield it from external impacts. On top of the tank can be a filling hole 8*a* for filling the water into the tank. At the bottom of the tank can be a drain hole 8*b* for emptying the tank. The size of the tank can be important to hold enough water to be usable for extinguishing any fire reaching the Fireline. At the same time, the size must also not exceed to an extent that disrupt the balance and stability of the dozer. The size of the tank can depend upon the size of the dozer. The tank can be made from a heavy steel plate. Suitable numbers of baffles can be provided inside the tank to reduce water movement preventing any wobbling that may destabilize the dozer. The tank can be made from a water-resistant material. Alternatively, a coating can be provided at least on the inner surface of the tank that prevents any kind of corrosion, such as a rust preventive coating. The conduit connecting to the bottom of the tank can also be galvanized to keep corrosion to a minimum.

Connected to the pump can be a custom-built water pipe assembly that can be custom fitted for each dozer to deliver water to one or more hose reels 2 mounted on one or more locations on the dozer but typically on the sides of the dozer. The hose reels can typically carry at least 100 feet of hardline hose with a hose nozzle appended that fire personnel can use to put out fires. FIG. 2 shows two hose reels on the left and right side of the dozer present at the engine compartment doors. Valves 2*a* can be used to turn on and off the water supply to different hose reels.

Figure 3:
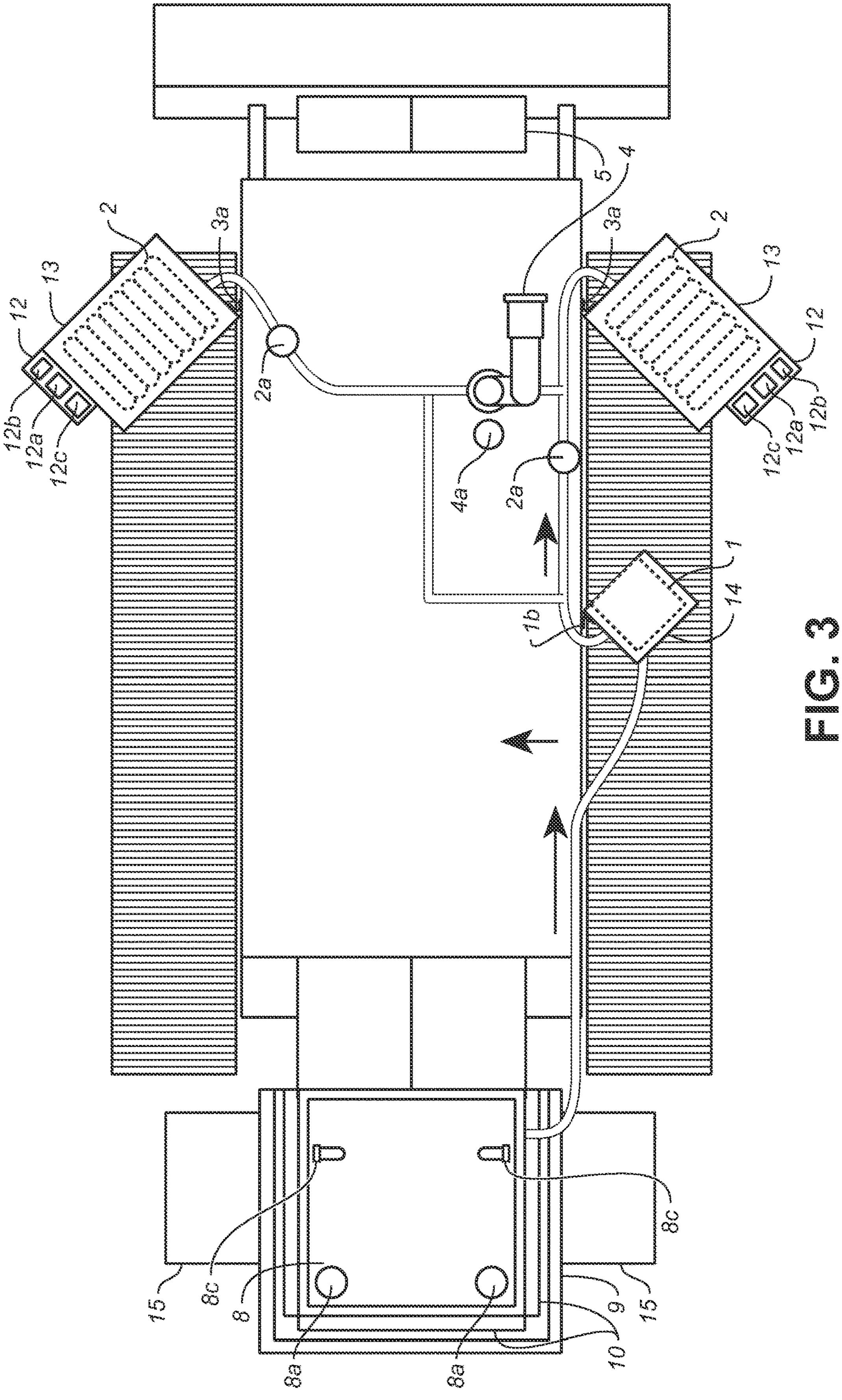
FIG. 3 shows the pumps and the cabinets swiveled outwards, according to an exemplary embodiment of the present invention.

FIG. 3 shows the hose reels 2 in a protective hose reel steel cabinets 13 that are mounted on a hose reel platform 3 and a platform hinge 3*a* can couple the hose reel platform 3 to the dozer. The hose reel cabinets can swing out of the way to allow access to the engine compartment for maintenance and repairs.

The apparatus can further include a single monitor 4 that can be mounted on top of the engine hood forward of the Exhaust Stack. The monitor can be coupled to a control unit that can connect to different components of the dozer and the apparatus for receiving the input. The control unit can be remotely controlled. The control unit can be connected to the pump, water tank, hose reels. The level of water in the water tank can be read by a sensor that provides the reading to the control unit and the same can be displayed on the monitor. Similarly, the status and use of hose reels can be shown on the monitor. The monitor can be positioned in line with the exhaust stack so as not to compound and obstruct the operators view.

The apparatus can further include Fire hose manifolds 12 with 1.5-inch fire hose outlet 12*a* and 1.0-inch fire hose outlets 12*b*, both with the valves, and can be installed adjacent to the hose reels. The apparatus can further include sprinklers/nozzles that may be arranged on distinct positions of the dozer such that to spray water on the ground (Fireline) around and nearby the dozer, such as surroundings of the dozer. The nozzles can also spray water on body of the dozer as a safeguard against fire damaging the dozer. The operation of these spray nozzles/sprinklers can be controlled by the control unit in the operator's cabin.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus for a bulldozer, the apparatus comprises:
- a frame configured to couple to a rear of a bulldozer;
- a tank mounted to the frame, the tank configured to hold water, the tank comprises a plurality of baffles dispersed throughout an inner volume of the tank, the plurality of baffles are configured to prevent wobbling of the water inside the tank during movement of the bulldozer;
- a water pump that has an input and an output, the input of the water pump is coupled to a bottom of the tank through a conduit to receive water from the tank, the output of the water pump is coupled to one or more hose reels;
- a hingedly coupled platform, wherein the water pump is mounted to the hingedly coupled platform;
- two hose reel platforms positioned don left and right sides of the bulldozer at engine compartment doors, the two hose reel platforms are hingedly coupled to the bulldozer;
- two hose reels mounted on the two hose reel platforms respectively; and
- a plurality of spray heads configured to mount at predefined positions on the bulldozer and spray water from the tank in a surrounding of the bulldozer.

2. The apparatus according to claim 1, wherein the apparatus further comprises:
- two cabinets encasing the two hose reels, wherein the two cabinets are mounted to the two hose reel platforms.

3. The apparatus according to claim 2, wherein the water pump is encased in a protective housing.

4. The apparatus according to claim 1, wherein the apparatus further comprises a control unit, wherein the control unit is operably coupled to the plurality of sprayers for remotely controlling an operation of the plurality of sprayers.

5. The apparatus of claim 4, wherein the apparatus further comprises:
- a monitor mounted on a top of an engine hood forward of an exhaust stack, the monitor coupled to the control unit, the monitor configured to display a status of a water level in the tank and use of the two hose reels, wherein the monitor is positioned in line with the exhaust stack.

6. A dozer for controlling wildfires, the dozer comprises:
- a dozer body;
- a frame coupled to a rear of the dozer body;
- a tank mounted to the frame, the tank configured to hold water, the tank comprises a plurality of baffles dispersed throughout an inner volume of the tank, the plurality of baffles are configured to prevent wobbling of the water inside the tank during movement of the dozer;
- a water pump that has an input and an output, the input of the water pump is coupled to a bottom of the tank through a conduit to receive water from the tank, the output of the water pump is coupled to one or more hose reels;
- a hingedly coupled platform, wherein the water pump is mounted to the hingedly coupled platform;
- two hose reel platforms positioned don left and right sides of the dozer at engine compartment doors, the two hose reel platforms are hingedly coupled to the dozer;
- two hose reels mounted on the two hose reel platforms respectively; and
- a plurality of sprayers configured to mount at predefined positions on the dozer and spray water from the tank in a surrounding of the fire dozer.

7. The dozer according to claim 6, wherein the dozer further comprises:
- two cabinets encasing the two hose reels, wherein the two cabinets are mounted to the two hose reel platforms.

8. The dozer according to claim 7, wherein the water pump is encased in a protective housing.

9. The dozer according to claim 6, wherein the dozer further comprises a control unit, wherein the control unit is operably coupled to the plurality of sprayers for remotely controlling an operation of the plurality of sprayers.

10. A method for controlling wildfire, the method comprising the steps of:
- providing an apparatus, the apparatus comprises:
  - a frame configured to couple to a rear of a dozer;
  - a tank mounted to the frame, the tank configured to hold water, the tank comprises a plurality of baffles dispersed throughout an inner volume of the tank, the plurality of baffles are configured to prevent wobbling of the water inside the tank during movement of the dozer;
  - a water pump that has an input and an output, the input of the water pump is coupled to a bottom of the tank through a conduit to receive water from the tank, the output of the water pump is coupled to one or more hose reels;
  - a hingedly coupled platform, wherein the water pump is mounted to the hingedly coupled platform;
  - two hose reel platforms positioned don left and right sides of the dozer at engine compartment doors, the two hose reel platforms are hingedly coupled to the dozer;
  - two hose reels mounted on the two hose reel platforms respectively; and
  - a plurality of sprayers configured to mount at predefined positions on the dozer and spray water from the tank in a surrounding of the dozer and spray water on the dozer through the plurality of sprayers.

11. The method according to claim 10, wherein the apparatus further comprises:
- more two cabinets encasing the more two hose reels, wherein the two cabinets are mounted to the two hose reel platforms.

12. The method according to claim 10, wherein the water pump is encased in a protective housing.

13. The method according to claim 10, wherein the apparatus further comprises a control unit, wherein the control unit is operably coupled to the plurality of sprayers for remotely controlling an operation of the plurality of sprayers.

* * * * *